(12) United States Patent
Hickman

(10) Patent No.: US 8,857,101 B1
(45) Date of Patent: Oct. 14, 2014

(54) FISHING LINE ASSEMBLY

(76) Inventor: David Hickman, Biloxi, MS (US)

( * ) Notice: Subject to any disclaimer, the term of this patent is extended or adjusted under 35 U.S.C. 154(b) by 359 days.

(21) Appl. No.: 13/494,459

(22) Filed: Jun. 12, 2012

(51) Int. Cl.
*A01K 91/047* (2006.01)

(52) U.S. Cl.
USPC .......................................... 43/42.72; 43/43.1

(58) Field of Classification Search
CPC ........ A01K 91/03; A01K 91/04; A01K 91/18
USPC ............... 43/42.72, 42.74, 43.1, 43.15, 44.98
See application file for complete search history.

(56) References Cited

U.S. PATENT DOCUMENTS

| | | |
|---|---|---|
| 3,745,688 A | 7/1973 | Brownlee |
| 4,205,478 A | 6/1980 | Emory |
| 4,395,841 A | 8/1983 | Cudnohufsky |
| 4,696,124 A | 9/1987 | Wille |
| 5,615,511 A | 4/1997 | Crane et al. |
| 6,079,143 A | 6/2000 | Cheatham, Sr. |
| 7,197,847 B2 | 4/2007 | Albrant, Jr. |
| 7,343,261 B1 | 3/2008 | Kell |
| 7,797,876 B2 | 9/2010 | McKelvey |

OTHER PUBLICATIONS

Hickman, David; Statement of David Hickman; Oct. 29, 2012.

*Primary Examiner* — Rob Swiatek
*Assistant Examiner* — Morgan T. Barlow
(74) *Attorney, Agent, or Firm* — Jones Walker, LLP

(57) ABSTRACT

A fishing line assembly includes an elastic rope fixedly attached to a non-elastic rope such that a free end of the non-elastic rope extends beyond a free end of the elastic rope. A fishing line is coupled to the non-elastic rope at an end opposite its free end, wherein the free ends of the elastic rope and the non-elastic rope are attached to a rigid portion of a watercraft so that the elastic rope can take up tension in the fishing line as it trails the watercraft. Preferably, the non-elastic rope has a thickness such that it can be handled under tension without cutting one's hands.

20 Claims, 2 Drawing Sheets

FISHING LINE ASSEMBLY

BACKGROUND

This disclosure relates to fishing implements generally, and to fishing lines for trailing watercraft specifically. A fishing line trailing a watercraft is desirable because it permits a fisherman to attend to other tasks or rods while the line passively creates an opportunity for catching fish.

SUMMARY

The following presents a simplified summary of the subject matter of this disclosure in order to provide a basic understanding of some aspects of illustrative embodiments of the invention. This summary is not an exhaustive overview of the details of these embodiments. Nor is this summary intended to identify key or critical elements of the invention or to delineate the scope of the invention. Its sole purpose is to present some concepts in a simplified form as a prelude to the more detailed description that is discussed later.

In a first embodiment, a fishing line assembly includes: a rope, a fishing line, and an elastic line; the rope including plural fibers, wherein the fibers are at least one of twisted and braided; the elastic line consisting essentially of elastic material and at least one fastener; the rope having a first end and a second end, the first end directly attached to the watercraft and the second end coupled to the fishing line; the elastic line having a first end and a second end, the first end directly attached to the watercraft and the second end fixedly attached to the rope between the ends of the rope; the rope having a portion extending from its watercraft attachment point to its attachment to the elastic line; the portion of the rope having a tension; the elastic line having a tension; the fishing line assembly having a first configuration wherein the tension of the elastic line is negligible; the fishing line assembly having a second configuration wherein the tension of the elastic line is greater than the tension of the portion of the rope; and the fishing line assembly having a third configuration wherein the tension of the elastic line is less than or equal to the tension of the portion of the rope.

In a further aspect, wherein in the first configuration, the fishing line assembly is at rest.

In a further aspect, wherein in the second configuration, the fishing line assembly trails the watercraft.

In a further aspect, wherein in the third configuration, a fish tensions the fishing line assembly.

In a further aspect, in the first configuration, the elastic line having a substantially unstretched length extending from its watercraft attachment point to its attachment to the rope, and the portion of the rope has a length greater than the substantially unstretched length of the elastic line; and in the third configuration, the elastic line having a fully stretched length extending from its watercraft attachment point to its attachment to the rope, and the portion of the rope has a length greater than or equal to the fully stretched length of the elastic line.

In a further aspect, in the first configuration, the elastic line having a substantially unstretched length extending from its watercraft attachment point to its attachment to the rope, and the portion of the rope has a length greater than or equal to the substantially unstretched length of the elastic line; and in the third configuration, the elastic line having a fully stretched length extending from its watercraft attachment point to its attachment to the rope, and the portion of the rope has a length less than the fully stretched length of the elastic line.

In a further aspect, the rope having a thickness such that it can be handled under tension without cutting one's hands.

In a second embodiment, a fishing line assembly including: a first line having a free end and an opposite end coupled to a second line; a third line having a free end and an opposite end fixedly attached to the first line between the ends of the first line; the first line having a portion extending from its free end to its attachment to the third line; the portion of the first line having a tension, and the third line having a tension; a first configuration wherein the tension of the third line is greater than the tension of the portion of the first line; and a second configuration wherein the tension of the third line is less than or equal to the tension of the portion of the first line.

In a further aspect, wherein in the first configuration, the fishing line assembly trails the watercraft.

In a further aspect, wherein in the second configuration, a fish tensions the fishing line assembly.

In a further aspect, the first line including plural fibers that are at least one of twisted and braided.

In a further aspect, the first line having a thickness such that it can be handled under tension without cutting one's hands.

In a further aspect, the second line including fishing line.

In a further aspect, the third line including an elastic material.

In a further aspect, in the first configuration, the third line having a partially stretched length extending from its watercraft attachment point to its attachment to the first line, and the portion of the first line has a length greater than the partially stretched length of the third line; and in the second configuration, the third line having a fully stretched length extending from its watercraft attachment point to its attachment to the first line, and the portion of the first line has a length greater than or equal to the fully stretched length of the third line.

In a further aspect, in the first configuration, the third line having a partially stretched length extending from its watercraft attachment point to its attachment to the first line, and the portion of the first line has a length greater than or equal to the partially stretched length of the third line; and in the second configuration, the third line having a fully stretched length extending from its watercraft attachment point to its attachment to the first line, and the portion of the first line has a length less than the fully stretched length of the third line.

In a third embodiment, in fishing line assembly including: an elastic rope fixedly attached to a non-elastic rope such that a free end of the non-elastic rope extends beyond a free end of the elastic rope; and a fishing line coupled to the non-elastic rope at an end opposite its free end; wherein the free ends of the elastic rope and the non-elastic rope are attached to a rigid portion of the watercraft so that the elastic rope can take up tension in the fishing line as it trails the watercraft.

In a further aspect, the first line including non-elastic rope having a thickness such that it can be handled under tension without cutting one's hands.

In a further aspect, wherein the free ends of the elastic rope and the non-elastic rope are directly attached to the rigid portion of the watercraft.

In a further aspect, further including: a first hook, including a bend and a point, attached to the fishing line; a second hook attached to a second fishing line; and the second fishing line directly attached to the bend of the first hook.

BRIEF DESCRIPTION OF THE FIGURES

The accompanying figures and detailed description exemplify illustrative embodiments of the invention, denoting like features with like reference numerals, in which.

Figure 1:
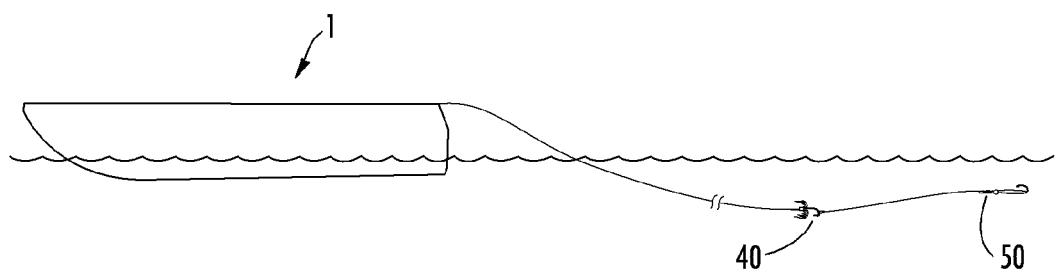
FIG. 1 is a side elevation view of one embodiment of a fishing line assembly trailing a watercraft, here a boat.

The figures are not drawn to scale.

DESCRIPTION OF REFERENCED NUMERALS 1 boat
2 fishing line assembly
10a first fastening hook
10b second fastening hook
11 elastic rope
12 non-elastic rope
12a free end of non-elastic rope
20 planer
22 fishing line
30 weights
40 first fishing hook
50 second fishing hook

DESCRIPTION

Illustrative embodiments are described with reference to the accompanying figures. In the interest of clarity, not all features of an actual implementation, e.g., dimensions, tolerances, etc., are described in this specification. It will be appreciated that in the development of any such actual embodiment, numerous implementation-specific decisions must be made to achieve the developer's specific goals, such as compliance with manufacturing and business-related constraints, that will vary from one implementation to another. Moreover, it will be appreciated that such a development effort may be complex and time-consuming, but would nevertheless be a routine undertaking for those of ordinary skill in the art having the benefit of this disclosure. An embodiment comprising a singular element does not disclaim plural embodiments; i.e., the indefinite articles "a" and "an" carry either a singular or plural meaning and a later reference to the same element reflects the same potential plurality. Ordinal designations are a shorthand reference for different components and do not denote any sequential, spatial, or positional relationship between them.

Figure 2:
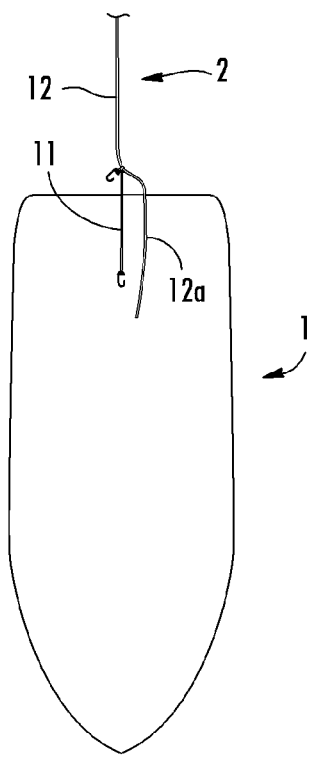
FIG. 2 is a top elevation view of the embodiment of FIG. 1.

FIGS. 1 and 2 show a boat 1, a type of watercraft, with one embodiment of a fishing line assembly 2 trailing behind the boat 1. In this embodiment, the fishing line assembly 2 comprises an elastic rope 11, a non-elastic rope 12 having a free end 12a, and fishing hooks 40, 50. Watercraft is a broad term and includes all rigid component parts or attachments of any vessel used for water transportation. An elastic material is one that spontaneously tends to resume its original shape after stretching. In one embodiment, the elastic rope becomes substantially fully elongated with a force of about 10 pounds. As used herein, a "non-elastic rope" does not mean perfectly inelastic but rather less elastic than the elastic rope. As shown in FIG. 2, one end of the elastic rope 11 is fixedly attached to the non-elastic rope 12. A fixed attachment is one that is not readily releasable. In one embodiment, the length of elastic rope is about twelve inches to about thirty inches, and the length of the non-elastic rope 12 is about ten fee to about twenty feet.

Figure 3:
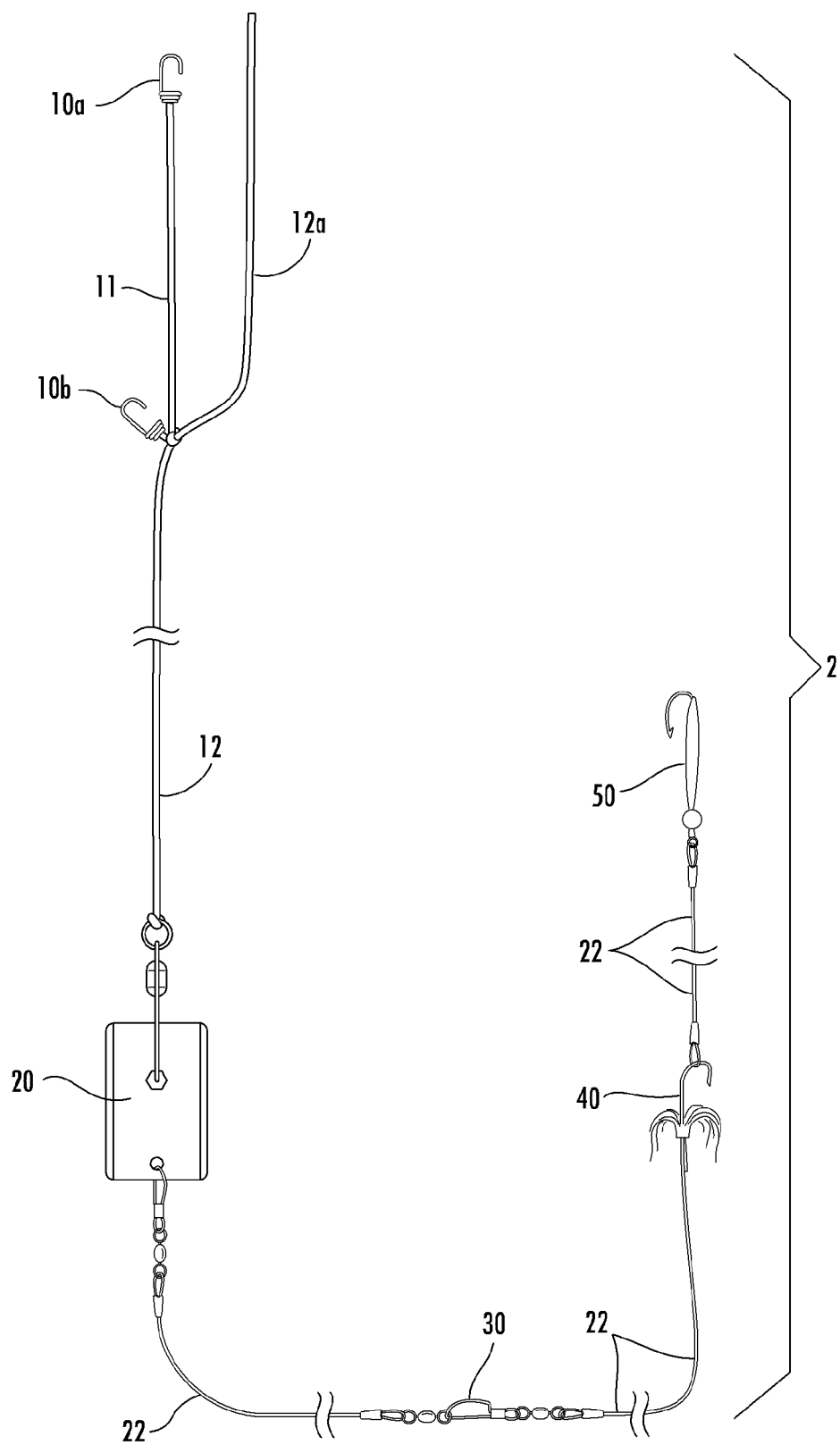
FIG. 3 shows another embodiment of a fishing line assembly.

Turning to FIGS. 2 and 3, in one embodiment, the fishing line assembly 2 has a first line 12, a second line 22, and a third line 11. Line is a broad term that includes long, flexible articles that can transmit a tension force, including such non-limiting examples as rope, cable, cord, monofilament fishing line, and others. A rope has its ordinary meaning as used in the fishing art. In a preferred embodiment, the first line 12 is a rope comprising fibers that are either twisted or braided. Preferably the rope is at least about ⅛ inches and more preferably about 5/16 inches to about ½ inches in diameter for ease of handling and to prevent cutting of one's hands when handling the rope under tension, such as when one is pulling in a hooked fish on the fishing line assembly.

For example, in another preferred embodiment, the first line may comprise a non-elastic rope 12 and a free end 12a. Also in this preferred embodiment, the second line 22 is a monofilament fishing line, and the third line 11 is an elastic rope consisting essentially of elastic material and at least one fastener, e.g., knot and fastening hooks 10a, 10b. Fastener is a broad term that includes a knot using the third line 11 itself. For example, in one embodiment the third line 11 is fixedly attached to the first line 12 and the attachment is merely a knot using the third line 11 around the first line 12. Hence, on the fixed end of the third line 11 there are two fasteners: the knot and the second fastening hook 10b. In one embodiment, the second fastening hook 10b is left loose.

The manner in which lines 11, 12 are attached to a boat 1 affects which line principally bears the tension of trailing fishing line assembly 2. In one embodiment, an elastic rope 11 is attached to an intermediate point along a non-elastic rope 12. The non-elastic rope 12 has a free end 12a extending from this intermediate point. In one embodiment, the fishing line assembly 2 is sold in consumer packaging (not shown) and there is no appreciable tension in the elastic rope 11 or the non-elastic rope 12, 12a. In another embodiment, the fishing line assembly 2 is attached to a boat, but it has not been cast over the boat's stern. In yet another embodiment, the fishing line assembly 2 is attached to a boat and has been cast over the boat's stern, but there is no relative movement between the water and the boat. In these embodiments, the fishing line assembly 2 has a configuration in which there is no appreciable tension in the elastic rope 11, i.e., such tension is negligible. In these and other situations, the elastic rope 11 is considered to be substantially unstretched.

In one preferable embodiment, the non-elastic rope's free end 12a is attached to the boat 1 such that there is slack in the non-elastic rope's free end 12a, and the elastic rope 11 is attached to the boat 1 such that it takes up tension from the trailing fishing line assembly 2 as it moves through the water. In this alternative configuration, the "baiting configuration" for short, the tension of the elastic rope 11 is equal to the tension of non-elastic rope 12 and is greater than the tension of the free end 12a. Here, the elastic rope 11 is partially stretched.

When a fish strikes the fishing line assembly 2, usually on one of the baited fishing hooks 40, 50, the tension of rope 12 increases such that the elastic rope 11 becomes extended to the point that the non-elastic rope's free end 12a is pulled taught. In this further alternative configuration, the "striking configuration" for short, the tension of the elastic rope 11 is less or equal to than the tension of the free end 12a, and the tension of the free end 12a is equal to the tension of rope 12. Once the free end 12 is pulled taught, the elastic rope 11 is considered fully stretched even if it would otherwise be capable of stretching further if not so constrained by the free end 12a. When the fishing line assembly 2 transitions from having the elastic rope 11 principally bear the tension of the non-elastic rope 12 to having the non-elastic rope's free end 12a principally bear the tension of the non-elastic rope 12, i.e., transitions from the baiting configuration to the striking configuration, the hook 40, 50 is set in the fish striking the bait.

In preferred embodiments, the free end 12a of the rope 12 and the free end of elastic rope 11 are directly attached to a rigid portion of a watercraft, such as the transom of a boat. This may be accomplished by the use of fasteners, including non-limiting examples such as bolts, screws, fastening hook 10a, or knots.

Returning to FIG. 2, a preferred embodiment is shown in which the free end 12a of the non-elastic rope 12 has a length that is greater than the elastic rope 11. If the free end 12a and the elastic rope 11 are attached at about the same position on the boat, then the free end 12a has a length that is at all times greater than or equal to the elastic rope 11. This result will also obtain if the elastic rope 11 is attached to the boat at a more sternward position than the free end 12a. If, on the other hand, the free end 12a is attached to the boat at a more sternward position than the elastic rope 11, then the free end 12a will have a length greater than the partially stretched elastic rope 11 in the baiting configuration, but the free end 12a may have a length less than the fully stretched elastic rope 11 in the striking configuration (assuming the elastic rope 11 is sufficiently elastic).

In an alternative embodiment, the free end 12a has a length that is less than or equal to the elastic rope 11. If the free end 12a and the elastic rope 11 are attached at about the same position on the boat, then the elastic rope 11 will remain substantially unstretched or slightly stretched because the free end 12a will principally bear the tension of the rope 12. If the elastic rope 11 is attached at a more sternward position on the boat than the free end 12a, then the elastic rope 11 will be substantially unstretched. Alternatively, if the free end 12a is attached at a more sternward position on the boat than the elastic rope 11, then the free end 12a may have a length less than the fully stretched elastic rope 11 in the striking configuration.

Turning to FIG. 3 in one embodiment, the rope 12 is coupled to fishing line 22 by a planer 20. Coupled has a different meaning from directly attached; while the rope 12 and fishing line 22 of FIG. 3 may be described as coupled, they are not directly attached because they are separated by a planer 20. Fishing line 22 includes non-limiting examples such as a monofilament line of any suitable gauge or test strength. In one embodiment, a suitable test strength is about sixty pounds to about 150 pounds. Weights 30 act to maintain the fishing line assembly 2 at an acceptable level in the water. The first fishing hook 40 has a bend and a point, and a second fishing hook 50 is attached to a fishing line 22, which in turn is attached to the bend of the first fishing hook 40.

Descriptions of some embodiments have been presented for purposes of illustration only. It is not intended to be exhaustive or to limit the invention to the precise form disclosed, and modifications and variations are possible in light of the above teachings or may be acquired from practice of the invention. The invention may be modified and practiced in different but equivalent manners that will be apparent to those skilled in the fishing art having the benefit of the teachings of this disclosure. The embodiments were chosen and described in order to explain the principles of the invention and its practical application to enable one skilled in the art to utilize the invention in various embodiments and with various modifications as are suited to the particular use contemplated. It is therefore evident that the particular embodiments disclosed above may be altered or modified and all such variations are considered within the scope and spirit of the invention. It is intended that the scope of the inventions be defined solely by the claims and their equivalents.

What is claimed is:

1. A fishing line assembly for trailing behind a watercraft, the fishing line assembly comprising:
    a rope, a fishing line, and an elastic line;
    the rope comprising plural fibers;
    the elastic line consisting essentially of elastic material and at least one fastener;
    the rope having a first end and a second end, the first end directly attached to the watercraft and the second end coupled to the fishing line;
    the elastic line having a first end and a second end, the first end directly attached to the watercraft and the second end fixedly attached to the rope between the ends of the rope;
    the rope having a portion extending from its watercraft attachment point to its attachment to the elastic line;
    the portion of the rope having a tension;
    the elastic line having a tension;
    the fishing line assembly having a first configuration wherein the tension of the elastic line is negligible;
    the fishing line assembly having a second configuration wherein the tension of the elastic line is greater than the tension of the portion of the rope; and
    the fishing line assembly having a third configuration wherein the tension of the elastic line is less than or equal to the tension of the portion of the rope.

2. A fishing line assembly comprising:
    a first line having a free end and an opposite end coupled to a second line;
    a third line having a free end and an opposite end fixedly attached to the first line between the ends of the first line;
    the first line having a portion extending from its free end to its attachment to the third line;
    the portion of the first line having a tension, and the third line having a tension;
    a first configuration wherein the tension of the third line is greater than the tension of the portion of the first line; and
    a second configuration wherein the tension of the third line is less than or equal to the tension of the portion of the first line;
    wherein the third line comprises an elastic material.

3. The fishing line assembly of claim 2, wherein in the first configuration, the fishing line assembly trails a watercraft.

4. The fishing line assembly of claim 2, wherein in the second configuration, a fish tensions the fishing line assembly.

5. The fishing line assembly of claim 2, the first line comprising plural fibers that are at least one of twisted and braided.

6. The fishing line assembly of claim 2, the first line having a thickness such that it can be handled under tension without cutting one's hands.

7. The fishing line assembly of claim 2, the second line comprising fishing line.

8. The fishing line assembly of claim 2, further comprising:
    in the first configuration, the third line having a partially stretched length extending from its watercraft attachment point to its attachment to the first line, and the portion of the first line has a length greater than the partially stretched length of the third line; and
    in the second configuration, the third line having a fully stretched length extending from its watercraft attachment point to its attachment to the first line, and the portion of the first line has a length greater than or equal to the fully stretched length of the third line.

9. The fishing line assembly of claim 2, further comprising:
in the first configuration, the third line having a partially stretched length extending from its watercraft attachment point to its attachment to the first line, and the portion of the first line has a length greater than or equal to than the partially stretched length of the third line; and
in the second configuration, the third line having a fully stretched length extending from its watercraft attachment point to its attachment to the first line, and the portion of the first line has a length less than the fully stretched length of the third line.

10. A fishing line assembly for attachment to a watercraft, the fishing line assembly comprising:
an elastic rope fixedly attached to a non-elastic rope such that a free end of the non-elastic rope extends beyond a free end of the elastic rope; and
a monofilament line coupled to the non-elastic rope at an end opposite its free end;
wherein the free ends of the elastic rope and the non-elastic rope are attached to a rigid portion of the watercraft so that the elastic rope can take up tension in the monofilament line as it trails the watercraft.

11. The fishing line assembly of claim 10, the first line comprising non-elastic rope having a thickness such that it can be handled under tension without cutting one's hands.

12. The fishing line assembly of claim 10, wherein the free ends of the elastic rope and the non-elastic rope are directly attached to the rigid portion of the watercraft.

13. The fishing line assembly of claim 10, further comprising:
a first hook, comprising a bend and a point, attached to the monofilament line;
a second hook attached to a second monofilament line; and
the second monofilament line directly attached to the bend of the first hook.

14. The fishing line assembly of claim 10, further comprising:
the non-elastic rope having a portion extending from its watercraft attachment point to its attachment to the elastic rope;
the portion of the non-elastic rope having a tension;
the elastic rope having a tension; and
the fishing line assembly having at least one of:
a first configuration wherein the tension of the elastic rope is negligible;
a second configuration wherein the tension of the elastic rope is greater than the tension of the portion of the non-elastic rope; and
a third configuration wherein the tension of the elastic rope is less than or equal to the tension of the portion of the non-elastic rope.

15. The fishing line assembly of claim 14, wherein in the first configuration, the fishing line assembly is at rest.

16. The fishing line assembly of claim 14, wherein in the second configuration, the fishing line assembly trails the watercraft.

17. The fishing line assembly of claim 14, wherein in the third configuration, a fish tensions the fishing line assembly.

18. The fishing line assembly of claim 14, further comprising:
in the first configuration, the elastic rope having a substantially unstretched length extending from its watercraft attachment point to its attachment to the non-elastic rope, and the portion of the non-elastic rope has a length greater than the substantially unstretched length of the elastic rope; and
in the third configuration, the elastic rope having a fully stretched length extending from its watercraft attachment point to its attachment to the non-elastic rope, and the portion of the non-elastic rope has a length greater than or equal to the fully stretched length of the elastic rope.

19. The fishing line assembly of claim 14, further comprising:
in the first configuration, the elastic rope having a substantially unstretched length extending from its watercraft attachment point to its attachment to the non-elastic rope, and the portion of the non-elastic rope has a length greater than or equal to the substantially unstretched length of the elastic rope; and
in the third configuration, the elastic rope having a fully stretched length extending from its watercraft attachment point to its attachment to the non-elastic rope, and the portion of the non-elastic rope has a length less than the fully stretched length of the elastic rope.

20. The fishing line assembly of claim 14, the non-elastic rope having a thickness such that it can be handled under tension without cutting one's hands.

* * * * *